United States Patent [19]

Bieri, Jr.

[11] Patent Number: 5,653,509
[45] Date of Patent: Aug. 5, 1997

[54] BLOCKAGE-PROTECTED DRIVE SYSTEM WITH A CENTRIFUGAL CLUTCH, AND SAWING APPARATUS DRIVEN THROUGH SAID CLUTCH

[75] Inventor: Hans Bieri, Jr., Pfäffikon, Switzerland

[73] Assignee: Hydrostress AG, Pfäffikon, Switzerland

[21] Appl. No.: 538,407

[22] Filed: Oct. 2, 1995

Related U.S. Application Data

[63] Continuation-in-part of PCT/CH94/00130 June 24, 1994.

[30] Foreign Application Priority Data

Oct. 6, 1994 [CH] Switzerland ............... 3012/94

[51] Int. Cl.$^6$ .............. E01C 23/09; F16D 43/18; F16D 43/22
[52] U.S. Cl. .............. 299/39.3; 192/12 R; 192/105 BA; 125/13.01
[58] Field of Search ............... 192/12 R, 52.5, 192/65, 103 B, 105 BA; 299/39.3; 83/DIG. 1; 125/13.01, 14

[56] References Cited

U.S. PATENT DOCUMENTS

| | | | |
|---|---|---|---|
| 2,521,943 | 9/1950 | Pitt | 192/103 B |
| 2,967,597 | 1/1961 | Binder | 192/105 BA |
| 3,971,463 | 7/1976 | Zindler | 192/52.5 X |

FOREIGN PATENT DOCUMENTS

| | | |
|---|---|---|
| 1153033 | 2/1958 | France . |
| 1152446 | 2/1958 | France . |
| 1179053 | 5/1959 | France . |
| 1310980 | 10/1962 | France . |
| 1319443 | 1/1963 | France . |
| 1566741 | 5/1969 | France . |
| 2701082 | 8/1994 | France . |
| 838973 | 5/1952 | Germany . |
| 2441009 | 3/1975 | Germany . |
| 682411 | 9/1993 | Switzerland . |
| 245713 | 6/1926 | United Kingdom . |
| 419792 | 11/1934 | United Kingdom . |
| WO87/04971 | 8/1987 | WIPO . |

*Primary Examiner*—David J. Bagnell
*Attorney, Agent, or Firm*—Frishauf, Holtz, Goodman, Langer & Chick, P.C.

[57] ABSTRACT

To prevent overloading of a clutch interposed between a driving, or input shaft (2, 112) and a driven, or output shaft (4, 115) upon blockage of the output shaft while continuous rotary power is being transmitted to the input shaft, a plurality of centrifugal weights (16, 117) are located on an output clutch member (14, 116) so that, in case of blockage of the output shaft, centrifugal force will immediately cease and power transmitting engagement between the input and output shafts will be disconnected. In order to permit starting of the clutch, a predetermined small frictional force between an input clutch member (6, 114) coupled to the driving or input shaft (2, 112) and the output clutch member (14, 116) is established, essentially independent of speed, for example under control of springs (22). Since the power connection between the input and output shafts ceases immediately upon blockage of the output shaft, feedback of blocking force, and hence impact loading on a drive motor (14) coupled to the input shaft, and gearing and the like connected thereto is effectively eliminated. The clutch is particularly suitable for use in floor saw—power pack apparatus, power bearing tools, saws, snow blowers or the like, where blockage of the output shaft, unless instantaneously decoupled from a power drive may cause hazards, and/or apparatus damage.

20 Claims, 4 Drawing Sheets

BLOCKAGE-PROTECTED DRIVE SYSTEM WITH A CENTRIFUGAL CLUTCH, AND SAWING APPARATUS DRIVEN THROUGH SAID CLUTCH

This application is a Continuation-in-Part of International Application PCT/CH94/00130, filed Jun. 24, 1994, United States designated.

FIELD OF THE INVENTION

The present invention relates to a drive system which includes a centrifugal clutch, which is so designed that, upon blocking of a driven output shaft, the clutch immediately, automatically and inherently, disconnects the output shaft from a driving or input shaft, and more particularly to rotary machinery, such as saws, boring machines and the like, especially for cutting, or handling aggregates, such as concrete, stoneware, masonry or the like, designed for transmitting substantial torque forces, and in which blockage of the rotating part of the equipment may cause damage thereto and, in a worst case, destruction thereof.

BACKGROUND

Centrifugal clutches are well known; they are used, typically, to connect a drive motor or engine to a load, while permitting the motor or engine to come up to speed from stopped condition without any substantial loading being initially placed thereon, and connecting the design load only when a predetermined speed, at which full torque is developed, has been obtained.

Centrifugal clutches use centrifugal weight which are connected to a coupling element which, in turn, is coupled or connected to a shaft driven by the motor. The centrifugal weights are, customarily, moved due to the rotary movement of the coupling element against the inner surface of a second coupling element which, usually, is drum-shaped or cup-shaped, or bell-shaped, and connected to the output shaft which, in turn, is then connected to the using equipment or machine, for example a rotary cutter, a saw, or other device. When the drive shaft rotates, the engagement force of the centrifugally acting weights becomes effective with the square of the speed. Consequently, by friction, the output shaft and the load connected thereto is gently started, since the increase in speed, due to the initially low frictional engagement of the centrifugally acting element is also still low. When synchronism has been achieved between the driving shaft and the output shaft, the pressure, and hence frictional force of the centrifugal weights is high.

If the output shaft is suddenly blocked, for example if a saw blade coupled thereto meets an obstruction, the clutch is subjected to excessive wear and tear since the driving shaft, in spite of the blocking of the output shaft, continues to rotate, and the frictional engagement force of the centrifugally acting elements continues.

When high power is to be transmitted, blockage of the output shaft can lead to red-hot overheating of the friction surfaces which are customarily present between the centrifugal weights and the cooperating clutch drum within a few seconds, and hence lead to destruction of the clutch mechanism. Repairs require that the entire machine be stopped, parts disassembled and exchanged, all of which is time-consuming and expensive. Additionally, the shock of the sudden blockage is fed back to the driving motor.

THE INVENTION

It is an object to provide a drive system with a centrifugal clutch in which, in case of blockage of the output shaft, the clutch will immediately disconnect, so that not only will the clutch be protected against overheating, but also shocks transferred back to the driving motor or engine are also eliminated. This decoupling should be effected without any external control equipment. It is an additional object of the invention to provide a drive system for rotary apparatus particularly adapted to handle heavy loads, such as aggregate cutters or saws, concrete or aggregate boring machines, snowblowers or the like, where rocks or stones in the snow mass to be blown may cause blockage of a rotary apparatus or the like.

Briefly, the centrifugal weights are coupled to a clutch portion which is connected to the output shaft, and an additional friction force torque transfer arrangement is provided to transfer some torque from the driving shaft to the output shaft, insufficient to operate the output shaft at rated speed and torque, but enough to permit initial rotation of the output shaft when unloaded, so that centrifugal forces can act on the centrifugal weights. Thus, at no load, and at speeds substantially below a predetermined operating speed, the output shaft is driven with slip between the driving or input shaft. As the speed of the output shaft increases, the frictional engagement of the centrifugal weights becomes increasingly effective—with the square of the speed of the output shaft. Full torque is then available from the output shaft. In case there should be a sudden blockage of the output shaft, the engagement force of the centrifugal weights—which is based on speed—will cease immediately and only the small residual torque used to start the clutch in operation will continue to be effective—which, however, can be easily controlled to a level where it does not cause damage, by suitable matching of the frictional elements connecting the driving or input, and the clutch output shafts.

In contrast to centrifugal clutches of the prior art, thus, the centrifugal weights are not located on the driving or input or first side to the clutch but, rather, at the driven or output or second side of the clutch.

Frictional elements which are continuously effective between the input or driving and output or driven shaft act in addition to the centrifugal coupling between the driving and driven shaft. Upon starting a motor, for example, coupled to the input or driving shaft, the output or driven shaft will be carried along, with substantial slip between the clutch elements coupled to the respective shafts. As the speed of the input shaft increases, and the speed of the output shaft likewise increases, the centrifugal weights begin to become effective until the clutch is in full engagement, and synchronism between the driving and driven shafts is obtained.

Upon sudden blockage of the driven or output shaft, the shaft of course will stop so that, inherently and without time delay, the centrifugal force also ceases to act on the weights and, hence, the forceful engagement of the centrifugal weights with the clutch part coupled to the input shaft no longer pertains. Consequently, the clutch parts coupled to the input shaft are disconnected and protected against overloading; the clutch cannot overheat. Only the relatively low, easily controlled frictional force between the driving and driven shaft will be effective. After the reason for the blockage has been removed, normal operation can be immediately resumed, without stopping and restarting the driving motor or any repair being necessary.

The particular clutch arrangement is especially suitable for boring apparatus or other cutting apparatus operating in aggregate material, such as in rocks, in concrete structures such as roadways or the like. If, for example, a concrete cutter or saw blade hits a blocking obstruction, for example a reinforcing rod or a very hard aggregate component, the centrifugal clutch in accordance with the present invention immediately separates the power transmitted by the motor from the load coupled thereto through the clutch. This immediate, inherent separation will prevent breakage of a milling cutter or a saw blade, or a boring tool used in a concrete boring machine. Damage to any one of the elements coupled to the clutch is thus effectively prevented.

The clutch is also particularly useful in snow-blowing machines, and especially road snow blowers, where rocks and large stones may be embedded in snow which has slid over a roadway. A rock can block the snow blower mechanism, causing immediate stoppage thereof and damage to the transmission mechanism. Use of the present invention prevents damage to the transmission of torque to the snow removal mechanism as such, so that, after clearing of any obstructions, the snow removal can proceed immediately. The clutch can be used in any apparatus where protection against blockage should, or must be provided.

DRAWINGS

DETAILED DESCRIPTION

Figure 1:
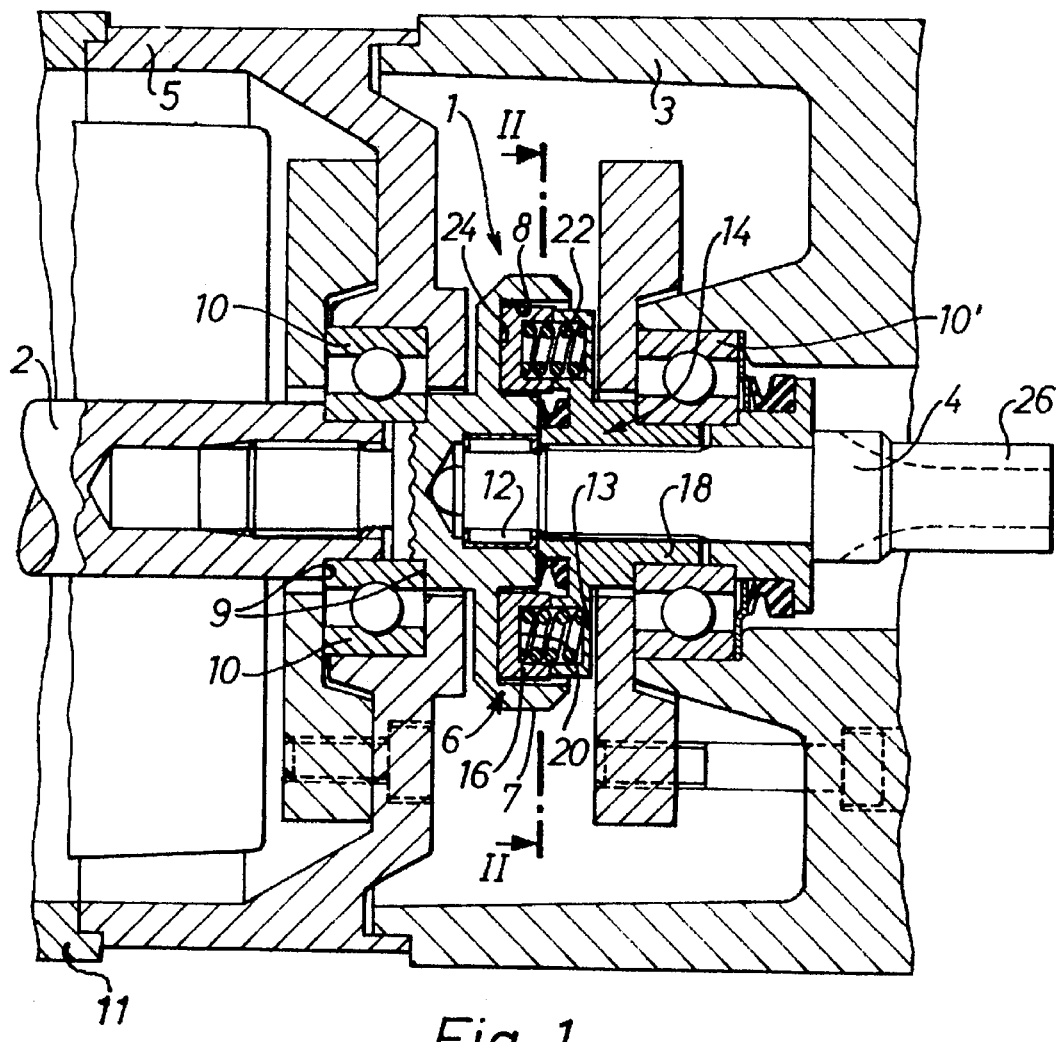
FIG. 1 is a schematic longitudinal sectional view through a drive system in accordance with the present invention.
Figure 2:
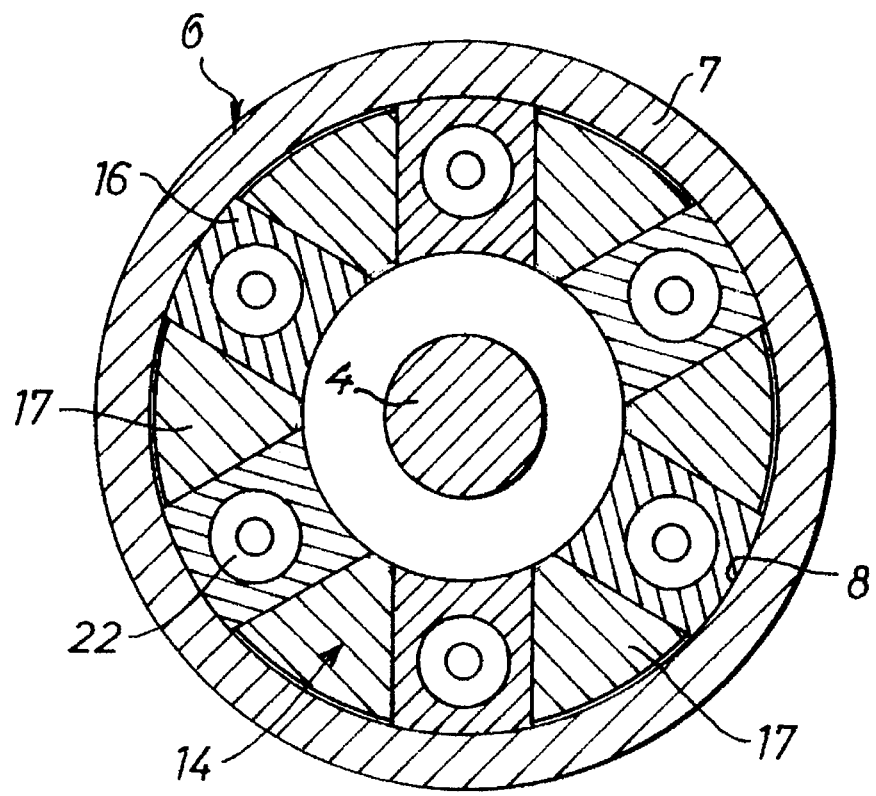
FIG. 2 is a transverse sectional view along the section line II—II of FIG. 1.

Referring first to FIGS. 1 and 2: The centrifugal clutch 1 is located within a housing having an essentially cylindrical outer jacket. The housing is formed of two housing parts 3, 5 which are removably connected together by an interengaging fit as shown. They are held together by suitable clamping screws or the like, not shown, since such connections are well known. One end of the housing portion 5 is coupled to a motor housing 11, or to any other suitable structure e.g., a frame, for example holding a drive wheel, pulley or the like. The drive shaft 2 is operatively coupled to a motor or engine, for example a Diesel engine or an electromotor, if necessary with the interposition of a transmission.

A first clutch element 6 is secured to the drive or input shaft 2 to reliably rotate therewith. The first clutch part 6 is somewhat drum-shaped, or bell-shaped, having an essentially cylindrical drum-like portion 7. The portion 7 has, a cylindrical friction surface 8. The friction surface 8, as seen in FIG. 1, is at the inside of the drum-like part 7. The drive shaft 2 and the first clutch element 6, preferably, are formed as two parts, as shown coupled together for example by a spline and set-screw or pin connection, since it is easier to make it that way. Alternatively, the clutch part 6 and the shaft 2 can be one integral unit. The clutch part 6 and the drive shaft 2 are rotatably retained in the housing 5 by a ball bearing 10, located in the part 5 and held therein in shoulders 9.

A second clutch part 14 is connected to the driven or output shaft 4, projecting from a hub 18. The output shaft 4 engages within a coaxial bore of the driving shaft 2; it is rotatably retained in the housing part 3 by a ball bearing 10'. Preferably, the driving and driven shafts are supported coaxially with respect to each other by another rotating bearing, for example and preferably a needle bearing 12 interposed between the inner end portion of the shaft 4 and a blind bore in the first clutch part 6, or the drive shaft 2, respectively, if the clutch part 6 and the drive shaft 2 are one single element. The driven or output shaft 4 and the second clutch part 14 can also be constructed as a single unitary element. The output end of the output shaft 4 is formed as a coupling stub 26 for connection to an output machine or unit, for example a core boring machine.

In accordance with the present invention, centrifugal weights 16 are located on the output side, or the second coupling part 14. As best seen in FIG. 2, the second or output coupling part 14 retains a plurality of circumferentially uniformly distributed centrifugal weights 16. Preferably, three or six weights are used. The centrifugal weights 16 are located loosely in recesses between essentially triangular-shaped portions 17 of a disk-shaped portion 13 of the clutch part 14. The centrifugal weights 16 have radial play. Each one of the centrifugal weights 16 is formed with a central, axially directed blind bore 20 (FIG. 1) in which a spiral spring 22 is engaged. The spiral springs 22, when the clutch is assembled, are somewhat prestressed and engage on the one hand against the bottom of the blind bore 20 in the centrifugal weight 16 and, on the other, against the disc portion 13 of the output, or second clutch part 14. The springs 22 provide for a pressure on the centrifugal weights 16 against the axial surface 24 of the drive, or first coupling part 6. Thus, a continuously effective friction connection between the drive, or input or first shaft 2 and the driven, or output, or second shaft 4 is obtained. This frictional engagement, or frictional connection is so designed to be of such strength—or rather weakness—that, when the motor is coupled to shaft 2 is started, the output or driven shaft 4 is initially carried along with slip. The motor may be an electric motor, a hydraulic motor, or any other engine or drive source.

Operation

Upon starting the drive source coupled to the input or driving shaft 2, the weak frictional force between the axial end faces of the centrifugal weights 16 against the axial surface 24 of the input coupling part 6 causes the output shaft 4 to be carried along, with slip. As the speed of the driving or input shaft increases, the centrifugal weight 16 will likewise be rotated at higher speed and, under the effect of centrifugal force will be pressed outwardly and effect additional and strong friction at the axial inner friction surface 8 of the input clutch part 6. This further increases the speed of the output shaft 4, until the output shaft 4 is accelerated to synchronism with the input shaft 2.

The engagement force of the centrifugal weights 16 increases with the square of speed. The engagement pressure, and hence the friction between the centrifugal bodies 16 and the driving clutch part 6 will, when the nominal speed of operation of the clutch is reached, provide a high torque transmission between the now synchronously running drive shaft 2 and the driven shaft 4. The nominal, or design speed, usually, is the operating speed with which the respective tool or machine for which the clutch is connected is designed.

If, due to whatever causes, the driven shaft 4 is suddenly blocked, that is, cannot rotate any more, the centrifugal force, likewise, and equally suddenly and simultaneously drops or disappears. What is left in connecting force between the input shaft 2 and the output shaft 4 is only the relatively small frictional force generated between the input shaft 2 and output shaft 4 due to the engagement pressure of the springs 22 within the centrifugal elements. Feedback of sudden impulses and shocks from the sudden blockage of the shaft 4 to the driving engine through the shaft 2, and, if provided, to all the components coupled thereto, such as gearing, transmission or the like is thereby effectively avoided. The frictional materials of the friction surface 8, for example, which effects transmission of the operating torque, likewise, will not overheat; the engagement between the centrifugal elements 16 and the radial surface 24 is of such low force that any friction surfaces or materials which may be used, will not overheat.

Figure 3:
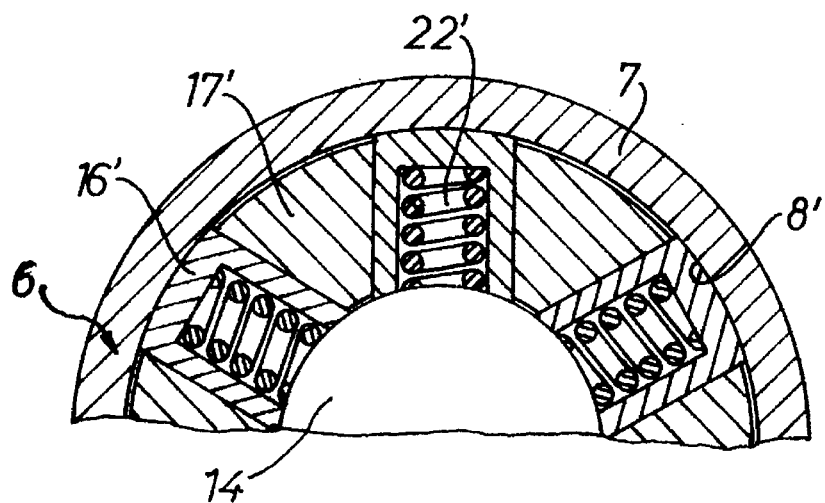
FIG. 3 is a fragmentary sectional view similar to FIG. 2, and illustrating another embodiment.

FIG. 3 illustrates another embodiment, in which springs 22', rather than acting in axial direction, act in radial direction on the centrifugal weights 16'. The springs 16' generate a desired, small initial friction connection between the drum-shaped portion 7 of the input clutch part 6' and the weights 16. This force, due to the design of the springs, will be small. It acts, radially, towards the inner friction surface 8' of the driving coupling element 6'. In operation, and as the speed of the driven, output coupling element 14 increases, the initial engagement force due to the springs 22 is superceded by the substantially increased centrifugal forces acting on the centrifugal weights 16' until synchronism, or at least essential synchronism between input shaft 2 and output shaft 4 obtains. The inner ends of the springs 22' can be suitably supported, for example on a sleeve, or on the hub 18 of the clutch part 14.

Centrifugal clutches as described are particularly suitable for core boring elements, for example to make relatively large cylindrical openings in thick reinforced concrete walls. Upon starting, and prior to boring operation, the boring machine is essentially unloaded, so that the output shaft 4 can run essentially freely. An aggregate boring tool, typically in the form of a hollowcylinder can jam during the boring operation within the bore hole, and thus be suddenly blocked; it may, also be blocked by a sudden extra hard aggregate element or the like. The clutch, as described, prevents damage to the driving motor, a transmission coupled thereto, and any other elements at the drive side of the clutch, as well as at the driving and driven sides of the clutch.

By suitable dimensioning, the clutch in accordance with the present invention can also be used as a slip clutch, as known, to permit some slippage upon overloading.

Figure 4:
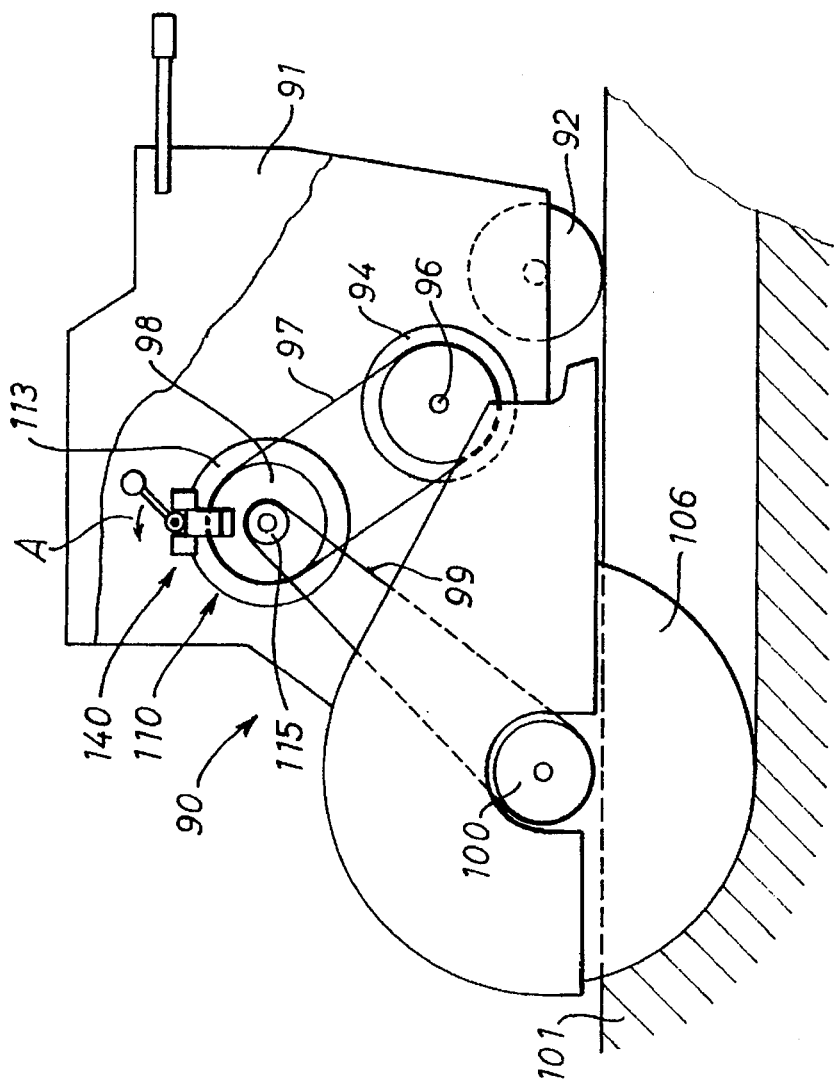
FIG. 4 is a schematic illustration of a concrete roadcutting machine, using the clutch of the present invention.
Figure 5:
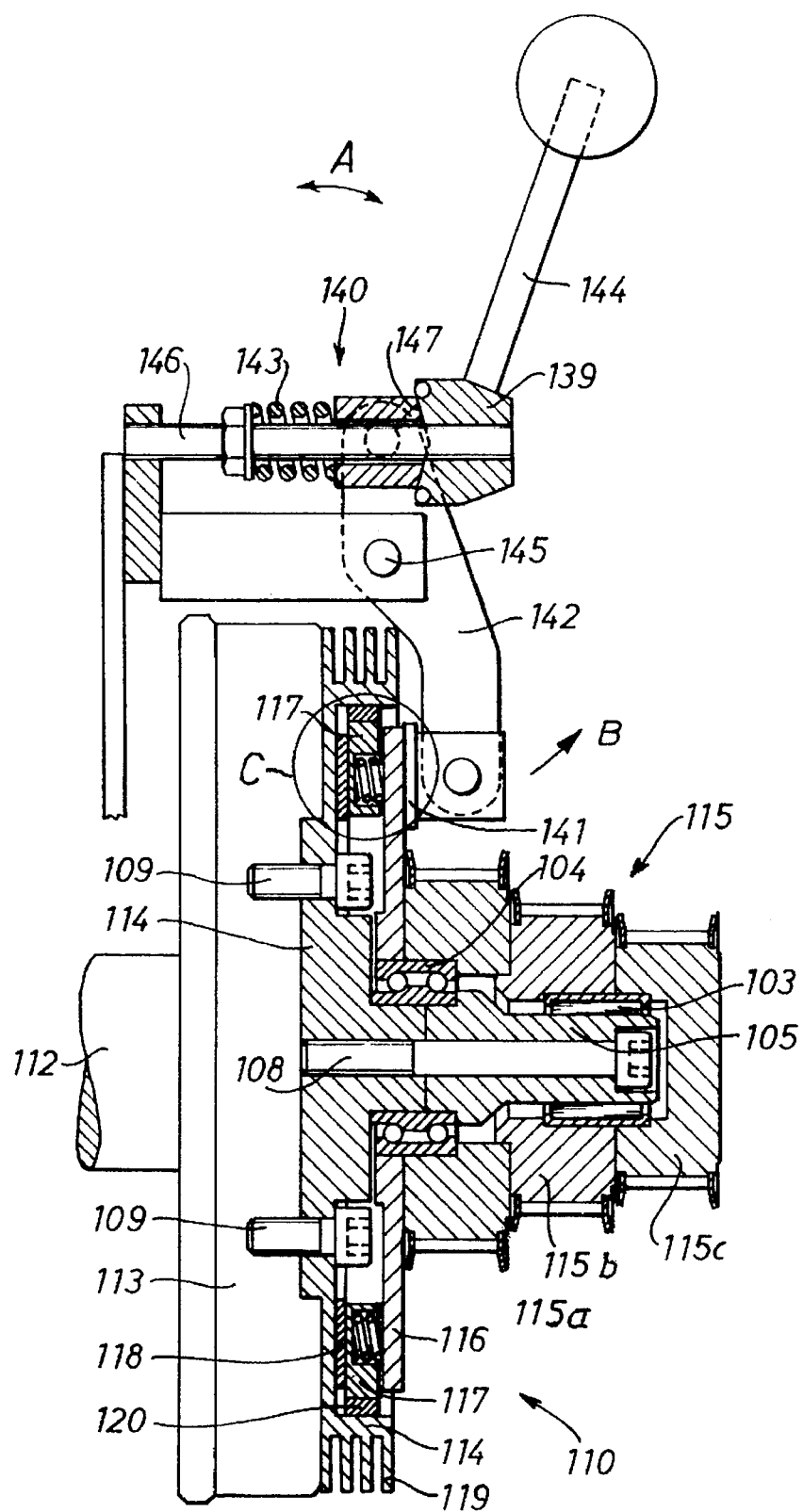
FIG. 5 is a schematic, essentially sectional view of another embodiment of the centrifugal clutch, particularly useful for the cutting or sawing machine of FIG. 4.

Another particularly important use for the clutch of the present invention is a machine to make cuts in concrete or other aggregate surfaces, for example cuts in roadways or the like. Such cuts are frequently necessary to place cables or conduits to be installed in an existing concrete roadway. FIG. 4 illustrates a movable floor saw and power pack 90 operating as a surface cutting machine. The machine has a chassis 91 with wheels 92. A motor 94 is located within the confines of the chassis 91. Motor 94 has an output shaft 96. A toothed or gear belt 97, or a chain or the like couples rotary force from the motor 94 to a drive pulley 98. The drive pulley 98 is coupled to a driving shaft 112 (FIG. 5) and to a fly wheel 113. A centrifugal clutch 110 is interposed between the fly wheel 113 and the output, or takeup or driven shaft 115. Details of the clutch 110 are shown in FIG. 5. FIG. 4 also illustrates a brake 140, the details of which are likewise illustrated in FIG. 5.

Torque is transferred from the output or driven shaft 115 to a drive pulley, or a drive sprocket 100 of a saw blade 106 by one or more V-belts 99, a sprocket chain, a toothed belt, or any other suitable rotary drive connection.

Preferably, three separate pulleys, or sprocket wheels 115a, 115b, 115c are connected to or form the output or driven shaft 115 of the clutch 110. The different diameter output pulleys permit driving the saw blade 106 at different speeds, given a design running speed of the motor 94.

Figure 6:
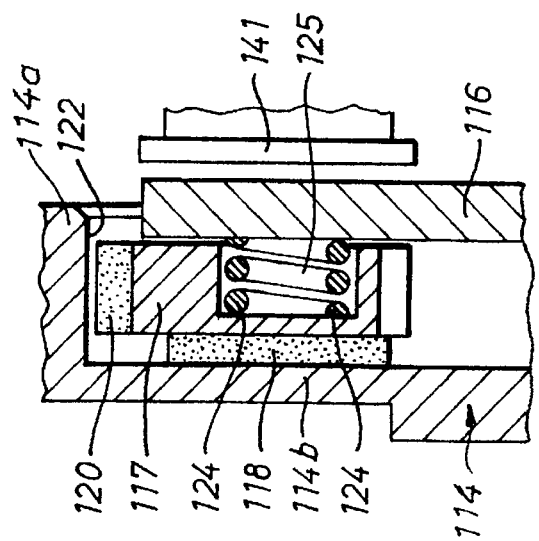
FIG. 6 is an enlarged fragmentary view of the portion within the circle C of FIG. 5, and illustrating a detail of a centrifugal weight.

The clutch 110, illustrated in FIGS. 4 to 6, is particularly suitable for concrete cutters, or other apparatus adapted to drive cutting or tools engageable in aggregate, concrete, rock or the like such as floor saws. Of course, the invention is not limited to such uses, and the clutch can be used also to drive other apparatus.

The centrifugal clutch 110 is a connection element between the driving, or input shaft 112 and the driven or output shaft 115 having pulleys 115a, 115b, 115c coupled thereto to permit engaged, or disengaged connection between the shafts 112 and 115. Intermediate elements can be used to couple the driving shaft 112 to the motor 94, as shown, or other rotation transmitting couplings can be used. Similarly, any suitable rotation transmitting coupling can be used between the respective output pulleys or sprocket wheels 115a, 115b, 115c and the saw blade 106. Tooths, or gear belts, such as belt 99, are preferred.

A drum-shaped or bell-shaped driving coupling element 114 is secured by screws 109 to the fly wheel 113. The drum-shaped clutch element 114 forms a first clutch part. A screw 108 couples a shaft extension 105 to the clutch element 114. The respective parts 105, 113, 114 are, preferably, made as separate parts for ease of manufacture; they could be made as a single, unitary part.

A second clutch part in form of a disc 116, is rotatably supported by a ball bearing 104 on a shoulder of the clutch part 114 and on the shaft extension 105. A needle bearing 103 is located between the output shaft 115 and the shaft extension 105. The output shaft, of course, carries, or includes, or is formed by the sprockets 115a, 115b, 115c. The axes of rotation of the driving shaft 112 and of the driven, or output shaft 115 are coaxial. The three sprockets 115a, 115b, 115c of different diameters may also be constructed as a single unitary element together with the clutch part 116.

In accordance with a feature of the invention, the centrifugal weights 117 are carried by the second, or output, or driven clutch part 116, which, by the ball bearing 104 and the needle bearing 103 is rotatable independently of rotation of the input or driving shaft 112. In this embodiment, three centrifugal weights 117 are provided, spaced from each other by 120° angles. The centrifugal weights 117 are radially slidably or shiftably located on the second clutch part 116. As best seen in FIG. 6, the drum-shaped first clutch part 114 has an axially facing ring-shaped friction layer 118 on radial portion 114b. The centrifugal weights 117 on the clutch part 116 are engaged against the friction layer 118 by spring pressure generated by springs 124 in each of the centrifugal weights 117. The springs 124 provide an axially acting essentially uniform spring force with which the respective weight 117 is pressed against the friction layer 118. The springs 124 are formed as prestressed spiral springs and are seated in a bore 125 of the respective weight 117. The centrifugal weights 117 additionally are provided with radially outwardly located friction pads or strips 120, facing the inner surface 122 of the drum-shaped, or bell-shaped extension 114a of the first coupling part 114. Preferably, the inner surface 122 on axial part 114a of coupling part 114 is also provided with a friction layer. This friction layer has been omitted from the drawing for simplicity of illustration.

Operation

Upon first starting rotation, from stopped condition of the driving shaft 112, the output or driven shaft 115 will be carried along by frictional engagement of the centrifugal weights 117 against the axial ring-shaped friction layer 118 on the disc-shaped portion 114b of the first clutch part 114. There will be slip between the rotary speed of the first clutch part 114, and the second, or output clutch part 116, so that the output or driven shaft 115 will rotate at a lesser speed than the speed of the driving shaft 112. As the speeds of the driving shaft 112, and the driven shaft 115 increase, the centrifugal weights 117 are moved, and then pressed radially outwardly. This engages the friction surface 120 of the weights 117 with the inner surface 122 of the axial extension 114a of the first clutch part 114 or, respectively, with a friction lining at the inner surface thereof, if provided. As the speed of the driven or output shaft 115 increases, the centrifugal force existing on the weights 117 increases with the square of the speed, until there will be, at least essential synchronism between the driving or input shaft and the driven, or output shaft, and full torque transmission is obtained.

The friction force between the friction layer 118 of the clutch part 114 and the centrifugal weights 117 is so dimensioned that the output or driven shaft 115, and any coupling elements and tools, for example the saw blade 106, connected thereto will be carried along, when unloaded, that is, when not doing any machining, or cutting work. Only when the clutch 110 engages, that is, when the centrifugal weights 117 engage radially outwardly against a drum-shaped extension of the first clutch part 114 will full speed and torque transmission be obtained.

If, due to external circumstances, the saw blade 106 (FIG. 4) is stopped, the outward shaft 115 will stop instantaneously and, consequently, the centrifugal force acting on the weights 117 will likewise cease instantaneously. The driving shaft 112 can continue to rotate, however, and only the small start-up friction of the weights 117 against the disc, or ring-shaped friction layer 118 will be subject to heating; this energy can be easily controlled.

The clutch 114 is associated with a brake 140, so that the driven, or output shaft 115 can be braked independently of rotation of the driving, or input shaft 112. The brake 114 has a brake shoe or pad 141 (FIG. 5) acting in axial direction against the outer facing side of the clutch part 116, which is coupled to the output or driven shaft 115. The brake shoe 141 is secured to one end of a double-armed lever 142, which is axially slidable on a shaft 146. The lever 142 can pivot about a bolt 145 secured to a chassis element of the saw 91.

The brake is operated by a manually operable lever 144, which, at its lower end, terminates in a head 139 which has a curved surface 147. The curved surface 147 engages against the upper end of the double-armed lever 142. A spring 143, located on the bolt or shaft 146 engages the other side of the upper arm of the lever 142.

Brake Operation

Upon pivoting of the lever 144 in either direction of, the arrow A, the brake shoe 141 is lifted OFF braking position, in the direction of the arrow B. When the lever is tilted to a substantial extent, two small rollers at the end will hold the lever in the brake-OFF position. FIG. 5 illustrates the lever in brake-ON position, where the spring 143 presses against the lever 142. Both the head 139 of the manually operable lever, as well as the upper portion of the double-armed lever have some play with respect to the shaft or bolt 146 to permit both relatively pivotable as well as sliding movement. Alternatively, the head 139 can have a cam surface and the lever then operates as shown by arrow A' in FIG. 4.

Of course, the centrifugal weights 117 could be constructed similar to the weights 16' (FIG. 3) in which the springs press the centrifugal weights radially against the inner surface 122 of the drum-shaped portion 114a of the first clutch part 114.

The frictional connection between the driving or input shafts 2, 112 and the driven or output shafts 4, 105 can be obtained by a frictional coupling of the respective shafts, or of the clutch parts connected thereto, independently of the centrifugal weights 16, 16', 117, respectively; care must be taken that this frictional coupling is just strong enough to carry along the output shaft upon rotation of the input shaft, so long as the output shaft is unloaded, while permitting slip, and insuring that any generated heat, arising during slip between the input and output shafts can readily dissipated.

The floor saw, or concrete road cutter of FIG. 4 is, preferably, operated this way: first, the motor 94 is started, while the brake 140 is in braking-ON condition. The drive shaft of the motor 24, for example a Diesel motor rotates at idle. The saw blade 106, however, will be stopped because of the engagement of the brake 140. The friction force, for example between the centrifugal elements 16 and surface 24 (FIG. 1) or centrifugal elements 117 and friction layer 118 (FIG. 5) will rub; the heating, however, will be minimal and cooling fins 119 located, for example, at the outer circumference of the axially extending portion of the clutch part 114 can readily dissipate any heat which arises.

When a cut in the bottom surface is to be made, as schematically indicated in FIG. 4, the brake 140 is released by operating manual lever 144 in the direction of the arrow A or, A' this, now, permits initial or preliminary frictional engagement between the clutch members 6, 114 and 14, 116 to become effective. The output shaft and consequently the saw blade 106 will begin to rotate, and as the centrifugal weight elements 16, 117 begin to engage against the axial portion of the first clutch member 6, 114, will accelerate at increasing rate until the speed of the saw blade has reached its operating speed in synchronism with the drive motor. At that point, the saw blade can be introduced into the bottom surface 101 to a selectable depth of cut, in accordance with tilting of chassis 91. If the saw blade for whatever reason, should suddenly jam tight in the cut, the centrifugal clutch immediately, and automatically becomes effective and disconnects power driving torque. The motor, however can continue to run, and the minor small frictional force which originally started the blade turning will not be damaging to either the clutch or the motor. The saw blade, now stopped, can be lifted out of the cut. It will, automatically again begin to rotate until synchronism between motor speed and saw blade is obtained. If, for safety reasons, it is not intended that the saw blade start by itself, it is only necessary to move the braking lever 140 in the ON position shown in FIG. 5, and the clutch will hold the output shaft in the stopped condition, permitting, for example, inspection of the cut, or replacement of the saw blade, without requiring, stopping, and restarting of the motor.

The clutch is specifically suited for transmission of power from a drive engine rated at about one hp up to several hundred hp.

Various changes and modifications may be made and any features described herein may be used with any of the others, within the scope of the inventive concept.

I claim:

1. Blockage protected drive system including a blockage protected clutch (1, 110), said system having a first, or input shaft (2, 112), having a predetermined operating speed;

a second, or output shaft (4, 115) coaxially located with respect to said first or input shaft;

said clutch (1, 110) being interposed between said first or input shaft and said second or output shaft, said clutch having a first, or input clutch member (6, 114) coupled to the first or input shaft (2, 112);

a second, or output clutch member (14, 116) coupled to the driven or output shaft (4, 115); and at least one radially movable centrifugally acting engagement element (6, 117) establishing a frictional torque transmitting driving connection between said first and second clutch members, and wherein, in accordance with the invention said at least one engagement element (6, 117) is located on said second or output clutch member (14, 116), and movable thereon radially outwardly for frictional engagement with the first, or input clutch member; and a frictional coupling means (16–24; 117–118) is provided, frictionally coupling said first clutch member (6, 114) and said second clutch member (14, 116) with a frictional force sufficient only to cause conjoint rotation of the first or input clutch member and the second, or output clutch member, when the output or driven shaft (4, 115) is unloaded, or freely rotatable, said frictional coupling means being effective at speeds from substantially below said predetermined operating speed while permitting slip between said first or input and said second or output shaft, said at least one centrifugally acting engagement element (16, 117) effecting driving, high torque transmission between said first or input clutch member (6, 114) and said second or output clutch member (14, 116) at speeds at least close to said predetermined operating speed and when the speeds of said input and output shafts are at least essentially the same.

2. The system of claim 1, wherein the clutch (1) comprises a two-part housing (3, 5) surrounding the first or input shaft (2) the second or output shaft (4) and said first and second clutch parts (4, 6);

and bearing means (10', 10) in each of said two part housing, and respectively rotatably retaining said shafts in said housing.

3. The system of claim 1, wherein one (2) of said shafts (2, 4; 112, 115) has a hollow end portion, the other (4) of said shaft fitting into said hollow end portion;

and bearing means (12; 103) located within said hollow end portion and relatively rotatably retaining said shafts (2, 4) coaxially with respect to each other.

4. The system of claim 1, wherein said first or input clutch member (6, 114) is drum, or bell-shaped and has an axially extending portion (114a);

and wherein a plurality of radially outwardly movable centrifugal engagement elements (16, 117) are provided, located on the second, or output clutch member (14, 116), said second clutch member being disc-shaped and said clutch elements being uniformly angularly distributed, and engageable with an interior surface (8, 122) of the axially extending portion (114a) of the first, or input clutch member (6, 114).

5. The system of claim 4, wherein said plurality of centrifugal elements (16, 117) is at least one of: 3, 6.

6. The system of claim 1, wherein said frictional coupling means comprises an axially acting frictional engagement connection between the least one centrifugally acting engagement element (16, 116) against said first clutch member (6, 114);

and engagement force means (22, 124) axially acting on said at least one engagement element to establish at frictional engagement force.

7. The system of claim 6, wherein said axially acting engagement force means is effective essentially independently of speed of rotation of said second clutch member (14, 116).

8. The system of claim 6, wherein said axially acting engagement force means comprises springs (22, 124).

9. The system of claim 1, wherein said frictional coupling means comprises radially acting force means (22') acting on said at least one engagement element (16, 16', 117) and providing a radially acting force engaging said engagement element (16', 117) against an axially extending portion (114a) of said first clutch member (6, 114) with a force which is essentially independent of the speed of rotation of said second clutch member (14, 116) and small with respect to the force with which said engagement element (16' 117) engages the first clutch member (6, 114) when said clutch is operating at said predetermined operating speed.

10. The system of claim 9, wherein said radially acting force means comprises springs (22').

11. The system of claim 1, further including a friction layer secured on said first clutch member (6, 114), said friction layer being positioned for engagement by said at least one centrifugally acting engagement element (16, 117) and providing a frictional force which transmits sufficient torque between the first clutch member (6, 114) and the second clutch member (14, 116), upon commencing rotation and speeding of the input shaft (2, 112) to said predetermined operating speed to rotate said second shaft (4, 114), when said second shaft is operating under no-load condition, until said second shaft has reached said predetermined rated operating speed, at which time rated torque transmission of said clutch will become effective by centrifugal coupling of said centrifugal elements (16, 117) with said first clutch member (6, 114).

12. The system of claim 1, further including an operator controllable brake operatively engageable with said second clutch member to permit braking of, and selectively holding stopped said second or output shaft independently of rotation of said input shaft with a force sufficient to overcome the frictional force of said frictional coupling means.

13. The system of claim 12, wherein said brake (140) comprises a brake shoe, or pad (141) axially engageable against an axial surface of said second clutch member (14, 116), and comprising a pivotable lever (42) pivotable about a fixed pivot axis (145) carrying said brake shoe or brake pad at one portion of said lever, another portion of said lever being spring-biased to press the lever, and hence the brake shoe or brake pad in braking direction against said second clutch member (14, 116) and;

releasable means, releasably holding the operator controllable handle in non-braking position, coupled to said pivotable lever.

14. The system of claim 13, in combination with a cutting machine, optionally a floor saw and power pack, for working on aggregate, or concrete, or masonry, or stone wherein the cutting machine comprises a chassis (91);

a motor (94) located on the chassis and having a motor output shaft;

a cutting element (106), optionally an aggregate-sawing blade rotatably secured to said chassis;

transmission means (96, 97, 98, 99, 100) coupling the motor shaft to said cutting element (106), optionally the sawing blade, whereby, when the cutting element (106) is in non-working, or idling state, and the motor (94) is started, the cutting element with the brake in ON state, will be prevented from rotation, and the frictional coupling means (16–24; 117–118) will slip, and, with the brake in OFF state, the cutting element will begin to rotate until said predetermined speed is reached, said brake (140) permitting braking of the tool independently of operation of the motor, and hence rotation of the motor shaft (96).

15. The system of claim 1, in combination with a cutting tool (106) and a motor (94), said system being interposed between an output shaft from the motor (94) and said cutting tool (106) and, selectively, rotationally coupling said motor and said cutting tool.

16. The system of claim 1, in combination with a cutting machine, optionally a floor saw and power pack, for working on aggregate, or concrete, or masonry, or stone, wherein the cutting machine comprises a chassis (91);

a motor (94) located on the chassis and having a motor output shaft;

a cutting element (106), optionally an aggregate-sawing blade rotatably secured to said chassis;

transmission means (96, 97, 98, 99, 100) coupling the motor shaft to said cutting element (106), optionally the sawing blade, whereby, when the cutting element is in non-working, or idling state, and the motor (94) is started, the cutting element will be driven to begin to rotate until said predetermined rated speed is reached.

17. A centrifugal clutch, optionally for driving a material working machine for working stone, concrete, aggregate, or similar materials having an input or driving shaft (2, 112);

an output or driven shaft (4, 115); and at least one centrifugal weight (16, 117) for coupling said shafts in torque transmitting relations, a first or input clutch member (6, 114) having an essentially drum-shaped or bell-shaped axially extending portion (114a), said first or input clutch member being secured to said driving or input shaft (2, 112);

a second or output clutch member (14, 116) of essentially disc-shape, positioned parallel to said input clutch member, and rotationally connected to said output or driven shaft (4, 115);

wherein said at least one centrifugal weight (16, 117) is guided in a radially displaceable manner on said second or output clutch member (14, 116) coupled to said output or driven shaft (4, 115);

said at least one centrifugal engagement weight (16, 117) being located, radially displaceable, on said second or output clutch member (14, 116) and, at a predetermined rated operating speed, radially outwardly acting by centrifugal force on an inner face of the axially extending portion (114a) of said first or input clutch member (6, 114) and by frictional engagement, provide for at least essential speed equality between the input or driving shaft (2, 112) and the output or driven shaft (4, 115), and thereby transmitting power, under load, to said output or driven shaft, and to output components rotationally connected thereto during rotation of said output shaft at essentially said predetermined rated speed, while upon blockage of the output shaft, said centrifugal force ceases and power transmission between said shaft is automatically interrupted; and frictional coupling means are provided between the input shaft and the output shaft transmitting torque sufficient to rotate the output shaft (4, 115) with just sufficient torque to drive said output shaft under no load conditions, whenever there is a speed difference between said input and output shafts;

wherein said frictional coupling means is essentially independent of speed and provides a frictional coupling force of essentially constant value whenever there is a speed difference between said input and output shafts, to rotate the output shaft, and any elements coupled thereto, until the output shaft (4, 115) reaches the speed of the driving input shaft (2, 112) as the at least one centrifugal weight element (16, 117) transmits rated torque of the clutch between said input and output shafts.

18. The clutch of claim 17, further including a friction lining (18) located on at least one of said first or input clutch member (6, 114) and on at least one of said at least one centrifugal weight;

said at least one centrifugal weight (16, 117) being in continuous engagement with a predetermined bias force with said friction lining as linings interposed, with said first clutch member (6, 114), said bias force being dimensioned such that the driven or output shaft (4, 115) is rotated, when unloaded, until engagement of the at least one centrifugal weight with centrifugal force (16, 117) against the axially extending portion (114a) of the first clutch member, when at least essential speed equality between the input and output shaft is obtained.

19. The clutch of claim 17, further including an operator controllable brake operatively engageable with said second clutch member to permit braking of, and selectively holding stopped said output or driven shaft independently of rotation of said input or driving shaft with a force sufficient to overcome the frictional force of said frictional coupling means.

20. The clutch of claim 17, in combination with a cutting tool (106) and a motor (94), said system clutch being interposed between an output shaft from the motor (94) and said cutting tool (106) and, selectively, rotationally coupling said motor and said cutting tool.

\* \* \* \* \*